United States Patent
Veneruso et al.

[11] Patent Number: 5,948,995
[45] Date of Patent: Sep. 7, 1999

[54] CROSS CORRELATION FLUID FLOW METER

[75] Inventors: Anthony Frank Veneruso, Ville D'Avray, France; Songming Huang, Hardwick, United Kingdom

[73] Assignee: Schlumberger Technology Corporation, Sugar Land, Tex.

[21] Appl. No.: 09/085,090

[22] Filed: May 26, 1998

Related U.S. Application Data

[62] Division of application No. 08/495,536, Aug. 29, 1995, Pat. No. 5,837,902.

[30] Foreign Application Priority Data

Jan. 29, 1993 [GB] United Kingdom ............... 9301763

[51] Int. Cl.[6] .................................................. G01F 1/712
[52] U.S. Cl. ................................... 73/861.06; 73/861.15
[58] Field of Search ..................... 73/861.06, 861.15, 73/861.25, 861.29

[56] References Cited

U.S. PATENT DOCUMENTS

| | | | |
|---|---|---|---|
| 4,019,038 | 4/1977 | Critten et al. | 73/861.06 |
| 4,583,409 | 4/1986 | Lannuzel et al. | 73/861.25 |
| 4,922,750 | 5/1990 | Magori | 73/861.29 |

*Primary Examiner*—Max H. Noori
*Assistant Examiner*—Harshad Patel
*Attorney, Agent, or Firm*—Peter Y. Lee; David P. Gordon; Wayne I. Kanak

[57] ABSTRACT

A cross correlation fluid flow meter including a body having first and second sensor devices positioned such that in use they are spaced apart a known distance in the direction of fluid flow, each sensor device having a signal transmitter and a signal receiver. According to one embodiment of the flow meter, the signal transmitter of the first sensor device is operable to transmit signals at a first frequency and the signal receiver of the first sensor device is arranged to receive signals at the first frequency. The signal transmitter of the second sensor device is operable to transmit a second signal at a second frequency and the signal receiver of the second device is operable to receive signals at the second frequency, the first and second frequencies being different from one another. The first sensor is non-responsive to the second frequency and the second sensor is non-responsive to the first frequency. Cross correlation of the received signals provides an indication of the fluid flow rate.

20 Claims, 6 Drawing Sheets

CROSS CORRELATION FLUID FLOW METER

This is a divisional of application Ser. No. 08/495,536, filed on Aug. 29, 1995, now U.S. Pat. No. 5,837,902, which is hereby incorporated by reference herein in its entirety.

The present invention relates to a flow meter for measuring fluid flows and to a method of measuring such flows. In particular, the invention relates to a cross-correlation flow meter and method which is useful for measuring multiphase flows of liquid(s) and gas(es).

Cross-correlation flow metering relies on measurements of the flowing fluid at two different places positioned a known distance apart along the flow. By cross correlating the measurements from the two places the time for corresponding events to pass between the two places can be calculated, and an indication of the flow rate can be obtained. Previous cross-correlation flow meters have relied on the injection of a marker or tracer into the flow which can be detected by the spaced sensors. Such a system is described in GB-A 1,001,022 in which a marker such as common salt or radioactive materials is introduced into the flow to be measured. As an alternative to the tracer or marker method suggested in GB-A 1,001,022, it is also possible to measure events which are inherent in the flow being measured, especially in multiphase flows. Such events might be the passage of groups of bubbles in a liquid/gas flow, or droplets in a liquid/liquid flow such as oil in water. The events can be detected by various techniques depending on the nature of the fluids concerned. Typically, changes in fluid density, electrical impedance, resistivity optical or ultrasonic properties of the flow can be sensed (see GB-A 2,057,141, GB-A 2,227,841, GB-A 2,194,058).

One particular application of cross-correlation flow metering is in the production logging of oil wells. In production logging, it is desirable to determine the flow rates of fluids being produced at different locations in the well. In order to achieve this, a logging tool comprising a flow meter is lowered into the well by means of a wireline cable, and flow measurements are made at the location of interest. In cases where oil is the continuous phase, the impedance of the flow can be measured to identify the events (see GB-A 2,227,841 aforementioned, GB-A 2,253,907 and our co-pending British patent application no: 92/04,854.5 [now GB-A 2,265,009]) describe systems for use when water is the continuous phase, and the resistivity is measured The problem of cross-talk is common in many measurement systems. A system might employ two pairs of electrodes, each pair comprising a transmitter electrode and a receiver electrode, one pair being situated downstream of the other, the object is to measure, say, the resistivity between the two electrodes comprising the first pair and correlate the measurements with those obtained at the second pair. However, in certain circumstances the signal from the transmitter of one pair might be received at the receiver of the other pair, creating an interfering signal which makes cross correlation increasingly difficult. Cross-talk can also occur in the electronic circuitry used to effect the detection and cross-correlation.

It is an object of the present invention to provide a cross-correlation flow measurement system in which the problem of cross-talk is reduced.

In accordance with a first aspect of the present invention, there is provided a cross correlation fluid flow meter comprising a body having first and second sensor means positioned such that in use they are spaced apart a known distance in the direction of fluid flow, each sensor means comprising a signal transmitter and a signal receiver, the signal transmitter of the first sensor means being operable at a first frequency and the signal receiver of the first sensor means being arranged to receive signals only at the first frequency and the signal transmitter of the second sensor means being operable at a second frequency and the signal receiver of the second sensor means being arranged to receive signals only at the second frequency, which flow meter is characterised in that the first and second frequencies are close but different, that the difference is such that a signal at one frequency is substantially undetectable at a receiver operating at the other frequency yet the response of the fluid to the transmitted signals at both frequencies is substantially the same, and that the two frequencies are not harmonically related.

In accordance with a second aspect of the present invention, there is provided a cross-correlation fluid flow meter comprising a body having first and second sensor means positioned such that in use they are spaced apart in the direction of fluid flow, each sensor means comprising a signal transmitter operable at a given frequency and a signal receiver, which flow meter is characterised in that the signal transmitters of the first and second sensors means are operable at said frequency but with a phase difference therebetween, and the signal receivers of the first and second sensor means are arranged to receive signals at said frequency only when the signals have the corresponding phase to that of the relevant transmitter.

The invention also provides methods of measuring fluid flow using one or other of the cross-correlation flow meters of the invention. Thus:

In accordance with a third aspect of the present invention, there is provided a method of measuring fluid flow comprising:

a) providing first and second sensor means at first and second locations spaced at a known distance in the direction of fluid flow, the sensor means each comprising a signal transmitter and a signal receiver;

b) transmitting a signal at a first frequency from the signal transmitter of the first sensor means, and detecting only signals at the first frequency at the signal receiver of the first sensor means so as to produce a first sensor signal;

c) transmitting a signal at a second frequency, which is different from the first frequency, from the signal transmitter of the second sensor means, and detecting only signals at the second frequency at the signal receiver of the second sensor means so as to produce a second sensor signal; and d) cross correlating the first and second sensor signals to determine the fluid flow rate;

which method is characterised in that the first and second frequencies are close but sufficiently different that a signal at one frequency is substantially undetectable at a receiver operating at the other frequency yet sufficiently similar that the response of the fluid to the transmitted signals at both frequencies is substantially the same; and the two frequencies are not harmonically related.

In accordance with a fourth aspect of the present invention, there is provided a method of measuring fluid flow comprising:

a) providing first and second sensor means at first and second locations spaced at a known distance apart in the direction of fluid flow, the sensor means each comprising a signal transmitter and a signal receiver, which method is characterised by b) transmitting a signal at a given frequency and phase from the signal transmitter of the first sensor means, and detecting only signals at such given frequency and phase at the signal receiver of the first sensor means so as to produce a first sensor signal;

c) transmitting a signal at said frequency with a phase signal which is different from that of the first transmitter from the signal transmitter of the second sensor means, and detecting only signals at the given frequency with said different phase at the signal receiver of the second sensor means so as to produce a second sensor signal; and d) cross correlating the first and second sensor signals to determine the fluid flow rate.

When differing frequencies are used the first and second frequencies are sufficiently different that a signal at one frequency is substantially undetectable at a receiver operating at the other frequency and yet are sufficiently similar that the response of the fluid to the transmitted signals at both frequencies is substantially the same. The two frequencies should not be harmonically related, i.e., the frequency of operation of one sensor are also not be a multiple of the frequency of the other. For example, when measuring a water continuous flow, the first and second frequencies might be in the range 5–7 kHz with a difference of about 1 kHz.

It is preferred that the frequency for a sensor is selected such that it is outside the passband of circuitry used for the other sensor. Each receiver is conveniently connected to a lock-in amplifier input, the amplifier operating at the appropriate frequency. The signal can be low-pass filtered and A/D processed.

Where a phase difference is used, it is preferred that there is a quadrature phase difference between the signals for the two sensors.

The flow meter according to the first aspect of the present invention conveniently forms part of an oilfield production logging tool such as that described in the aforementioned GB-A 2,265,009 (incorporated herein by reference).

The present invention will now be described by way of example, with reference to the accompanying drawings, in which.

Figure 1:
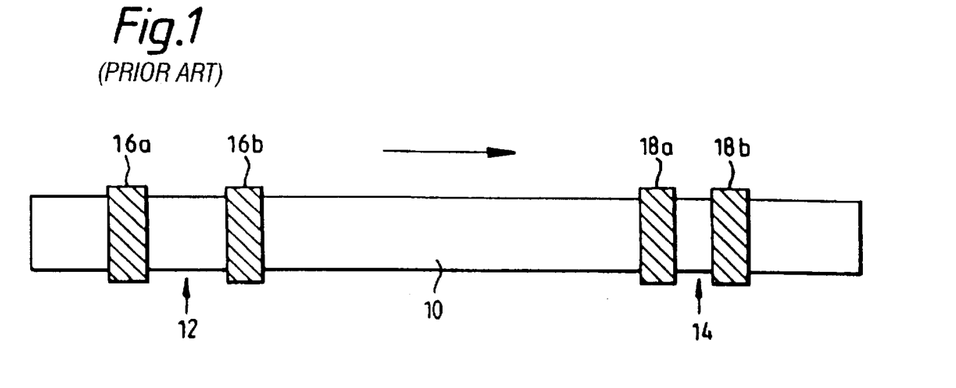
FIG. 1 shows a diagrammatic side view of a resistivity cross correlation production logging tool.
Figure 2:
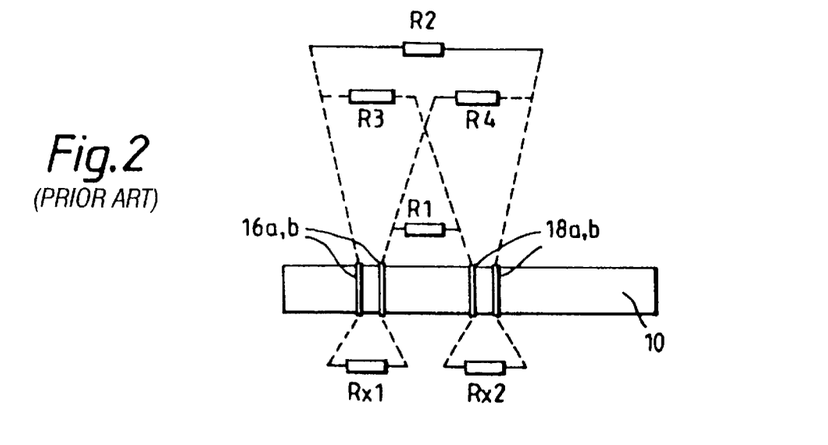
FIG. 2 shows the existence current paths available with the tool of FIG. 1.

Referring now to the drawings, FIG. 1 shows a diagrammatic view of a resistivity cross correlation flow measuring tool of the type described in British Patent Application 9204854.5. The tool generally comprises an insulating tool body 10 having two sensors 12, 14 spaced a known distance apart therein. Each of the sensors comprises a transmitter electrode 16a, 18a and a receiver electrode 16b, 18b spaced therefrom. In use, the transmitter electrodes 16a, 18a transmit an oscillating signal which is received by the associated receiver electrodes 16b, 18b via the fluid in which the tool is suspended. Since the tool is measuring the resistivity of the fluid in which it is suspended, it is necessary that, for a multiphase flow, the continuous phase is conductive, ie water when measuring flow in an oil well. It is intended that the current flow to be measured by the tool is between the transmitter and receiver electrodes of a given sensor, shown on FIG. 2 as paths $RX_1$ and $RX_2$ which are indicated as resistors since it is the resistivity between these two points which is being measured. It will be apparent that other parasitic current paths exist in the fluid between the electrodes on the tool. Parasitic current paths are undesirable because they cross couple with the sensor signals. These paths are shown on FIG. 2 as resistive paths R1, R2, R3, R4.

Figure 3:
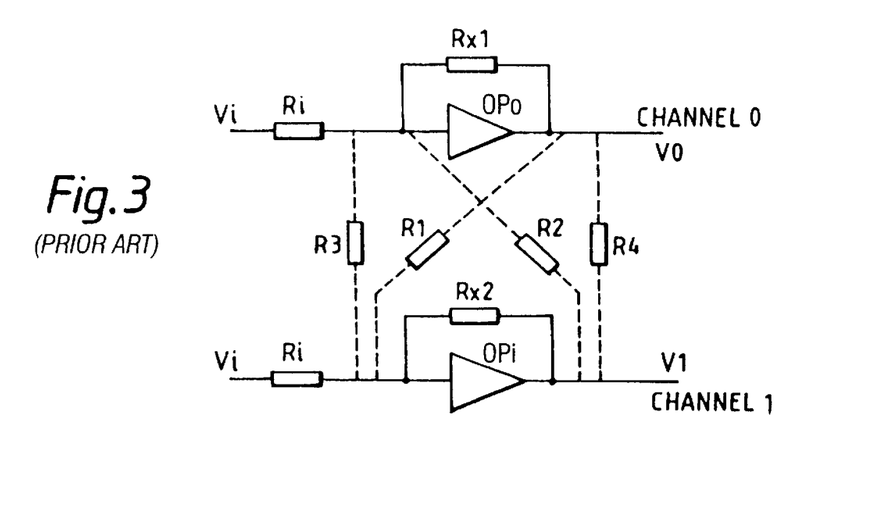
FIG. 3 shows the equivalent electric circuit to the tool of FIG. 1.

The equivalent electrical circuit is shown in FIG. 3 with resistances and operational amplifiers $OP_o$ and $OP_i$ indicated. The reference input signal voltage is shown as $V_i$ and the reference input resistance as $R_i$. The input/output channel 0 corresponds to sensor 12 and channel 1 corresponds to sensor 14. The existence of the parasitic current paths means that any signal detected is not merely the result of the appropriate transmitter signal propagating through the desired portion of the flowing fluid, but also includes interfering contributions from the other sensors. Since path R3 is between points of essentially identical potential and since path R4 is between the driver output of the op amps (low impedance sources), the contribution from these current paths can be ignored. However, this still leaves paths R1 and R2.

The present invention seeks to minimise the effect of current paths R1 and R2 by matching the receiver of one sensor to a characteristic of its associated transmitter, either frequency or phase, which is different and separable from that of the transmitter of the other sensor.

Figure 4:
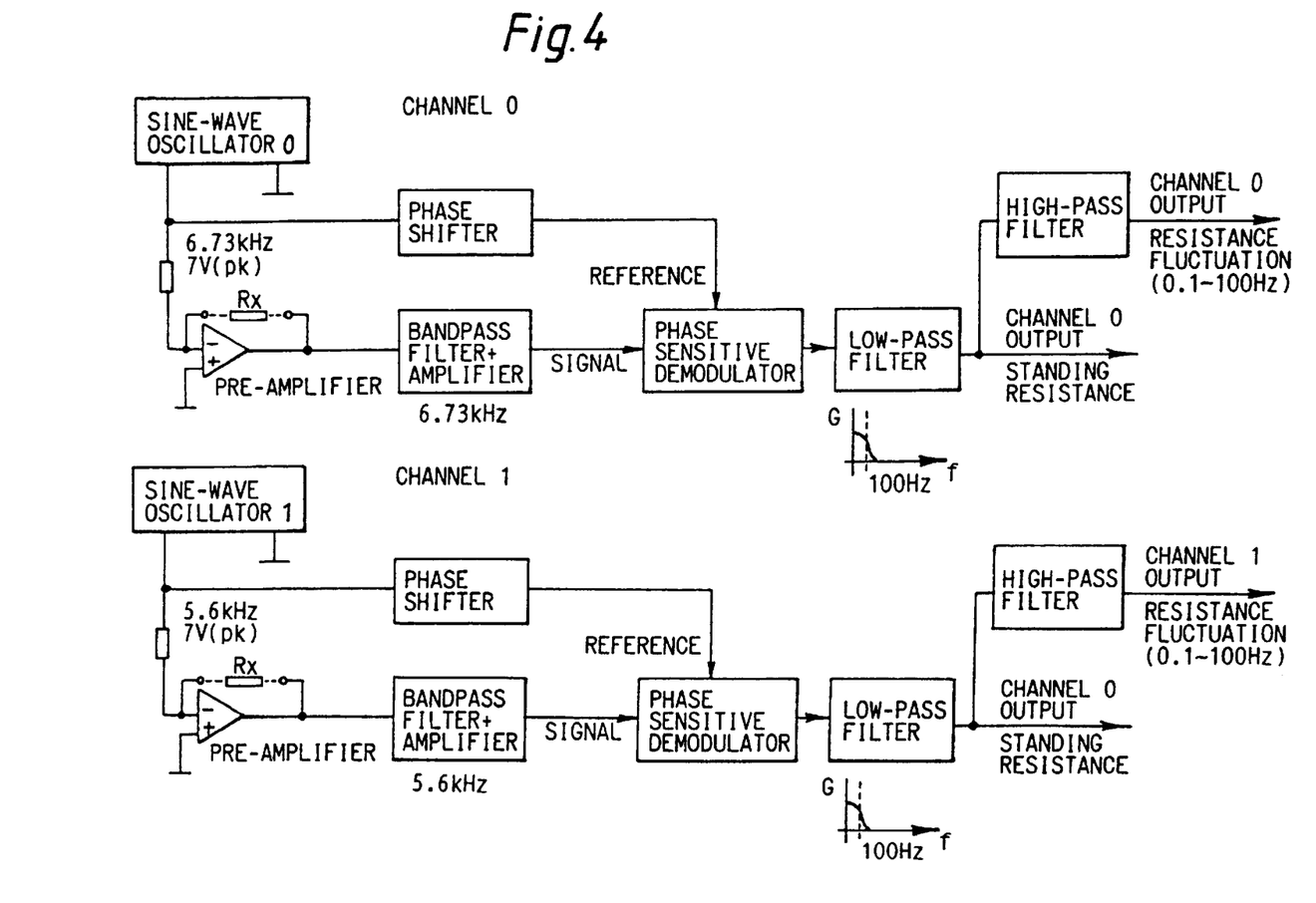
FIG. 4 shows a block diagram of the electronics for a tool according to a first aspect of the invention.

In accordance with a first aspect of the invention, two different excitation frequencies are used for the two channels. FIG. 4 shows this situation where two oscillators are used to provide each channel with a different excitation frequency, for example 6.73 kHz for channel 0 and 5.6 kHz for channel 1. The two frequencies are chosen to be not too dissimilar since measured sensor conductance changes with frequency in certain frequency ranges. With about 1 kHz difference in the range of 5 to 7 kHz, it can be assumed that the measured resistances of the two channels are reasonably close. Due to the cross talk, at the pre-amplifier output of each channel, there are signals of both 6.73 kHz and 5.6 kHz. In each channel a bandpass filter which is tuned to the excitation frequency of its own channel, is used. The filter typically has a Q value of about 3, and is used to provide some attenuation to the cross talk frequency at an early stage to avoid large cross talk amplitude which may cause circuit saturation. The filter also serves as a phase trimmer for the phase sensitive detector. By using the channel excitation as the reference signal, the phase sensitive demodulator (PSD) behaves like a bandpass filter with its centre frequency locked onto the channel excitation. In one embodiment of this invention, the PSD is implemented using an AD630 balanced demodulator chip from Analog Devices. The bandwidth of the PSD is determined by the lowpass filter following it. With a second order lowpass filter of 100 Hz bandwidth, the PSD provides 40 dB attenuation to the frequency of the other channel (about 1 kHz difference). The output of the lowpass filter represents the standing value of the measured resistance, and a highpass filter with a pass band of 0.1 Hz is used to extract the fluctuating signal, which can be used for cross correlation. Thus the bandwidth of the measurement system is 0.1–100 Hz which acts as a bandpass filter.

Figure 5A:
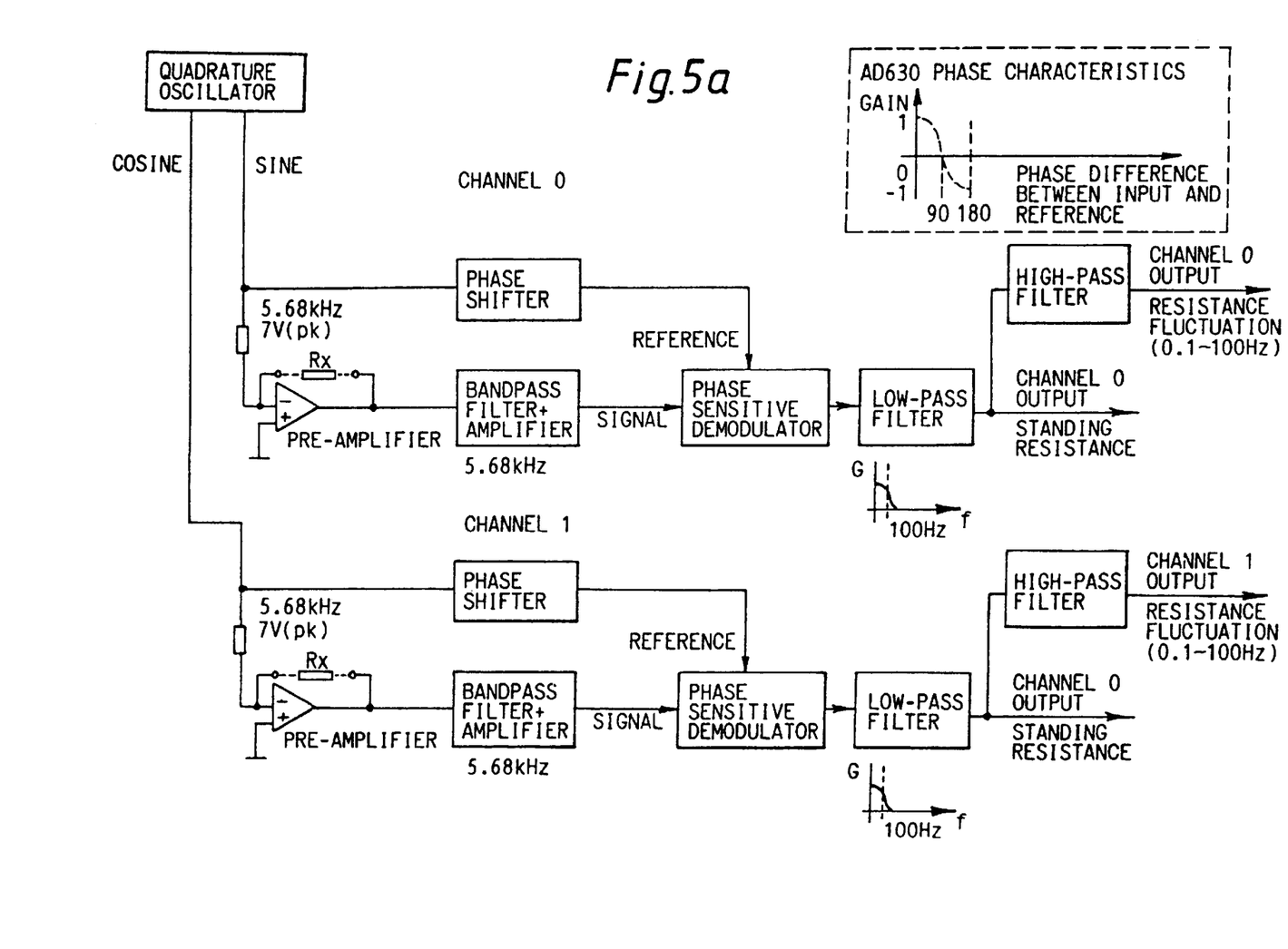
FIG. 5a shows a block diagram of the electronics for a tool according to a second aspect of the invention.

In accordance with a second aspect of the invention, both sensors use the same frequency but the excitation of one channel is made in quadrature phase with respect to that of the other. With the excitation of its own channel as the reference, the PSD rejects the cross talk signal which is 90 degrees out of phase. FIG. 5a shows the principle of the quadrature phase method The circuit differs from the dual frequency method only in the excitation source, where a quadrature oscillator replaces the two oscillators of different frequencies. In industrial implementation, the quadrant phase signals can be synthesised from a higher frequency square wave through some simple digital circuitry and bandpass filters, as illustrated in FIG. 5b, this technique may be more convenient than using two sinusoidal oscillators.

Figures 5B, 8, 9:
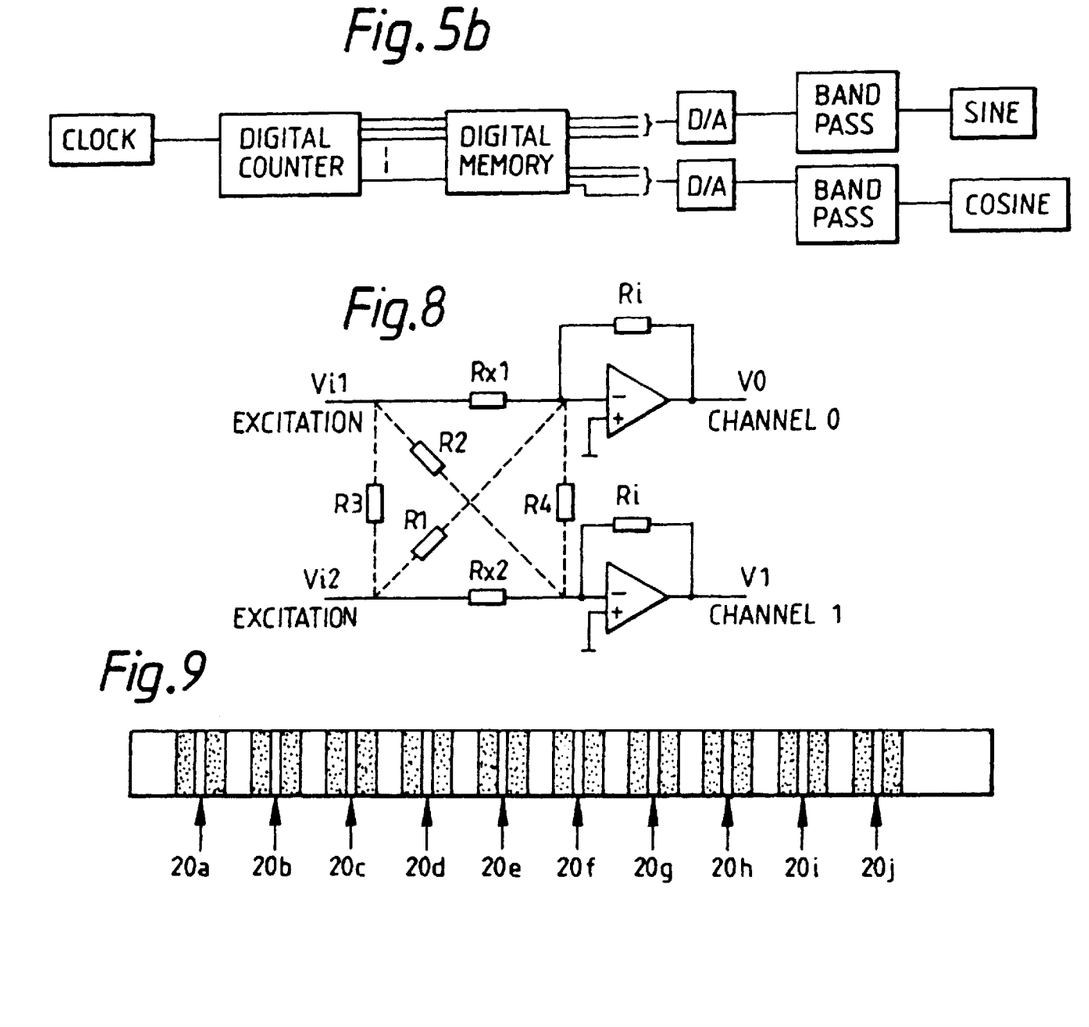
FIG. 5b shows a block diagram of a system for quadrative phase signals.
FIG. 8 shows an alternative sensor circuit to that shown in FIG. 3.
FIG. 9 shows an alternative tool configuration.

The cross talk problem can be further reduced by adapting the circuit arrangement shown in FIG. 8. This can be contrasted with the corresponding FIG. 3 which is discussed above. In that case, the unknown resistances $RX_1$ and $RX_2$ are connected across the op amps and the parasitic resistances R1 and R2 cause cross-channel gain modulations which cannot be completely removed due to the operation of the amplifiers. In FIG. 8, the unknown resistances $RX_1$, and $RX_2$ precede the op amps and a fixed resistor is connected across the op amps. Thus the parasitic current paths are removed from the op amp functioning and the problem of cross talk is reduced.

Figure 6:
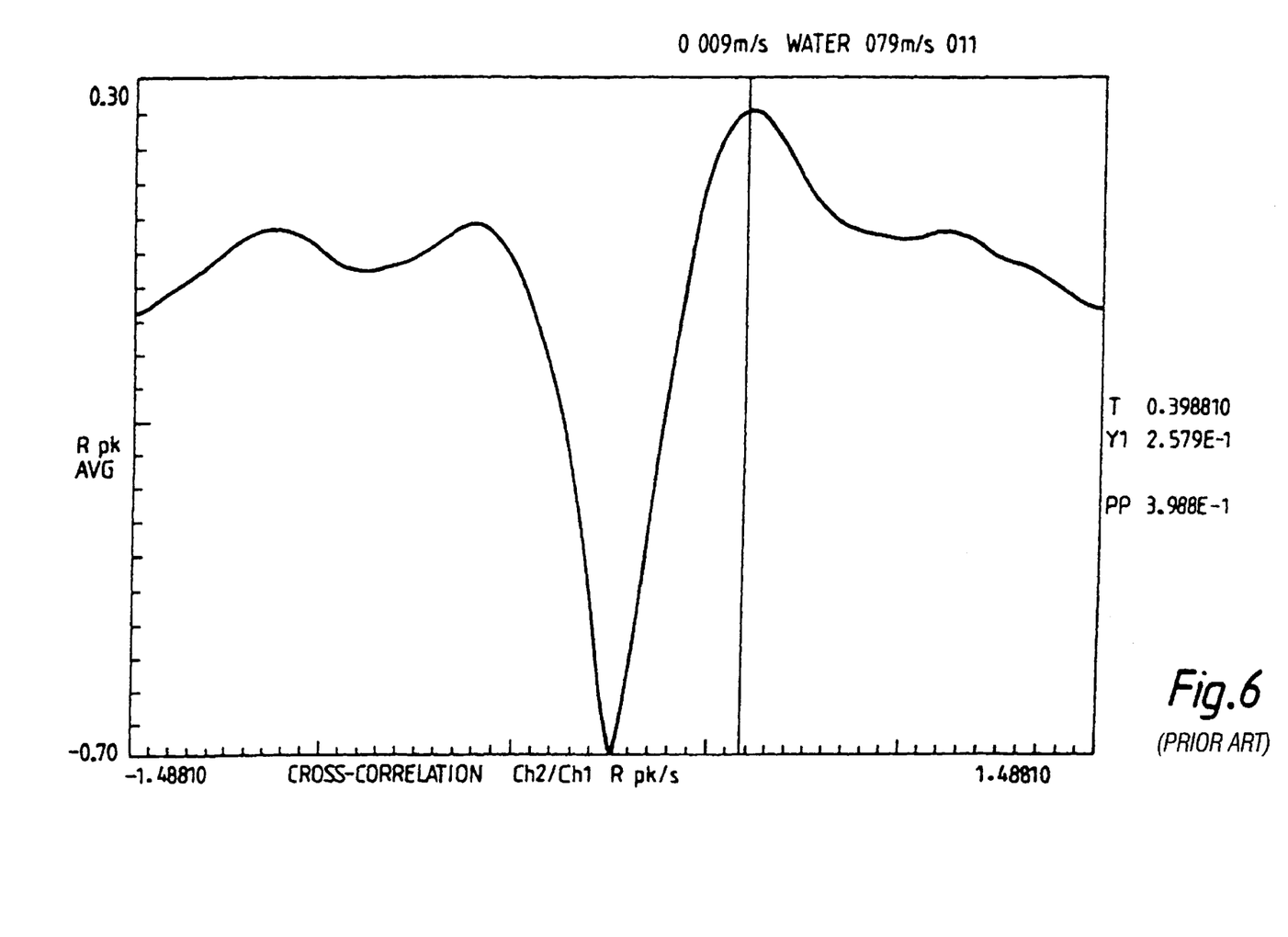
FIG. 6 shows a cross correlation for a prior art tool.
Figure 7:
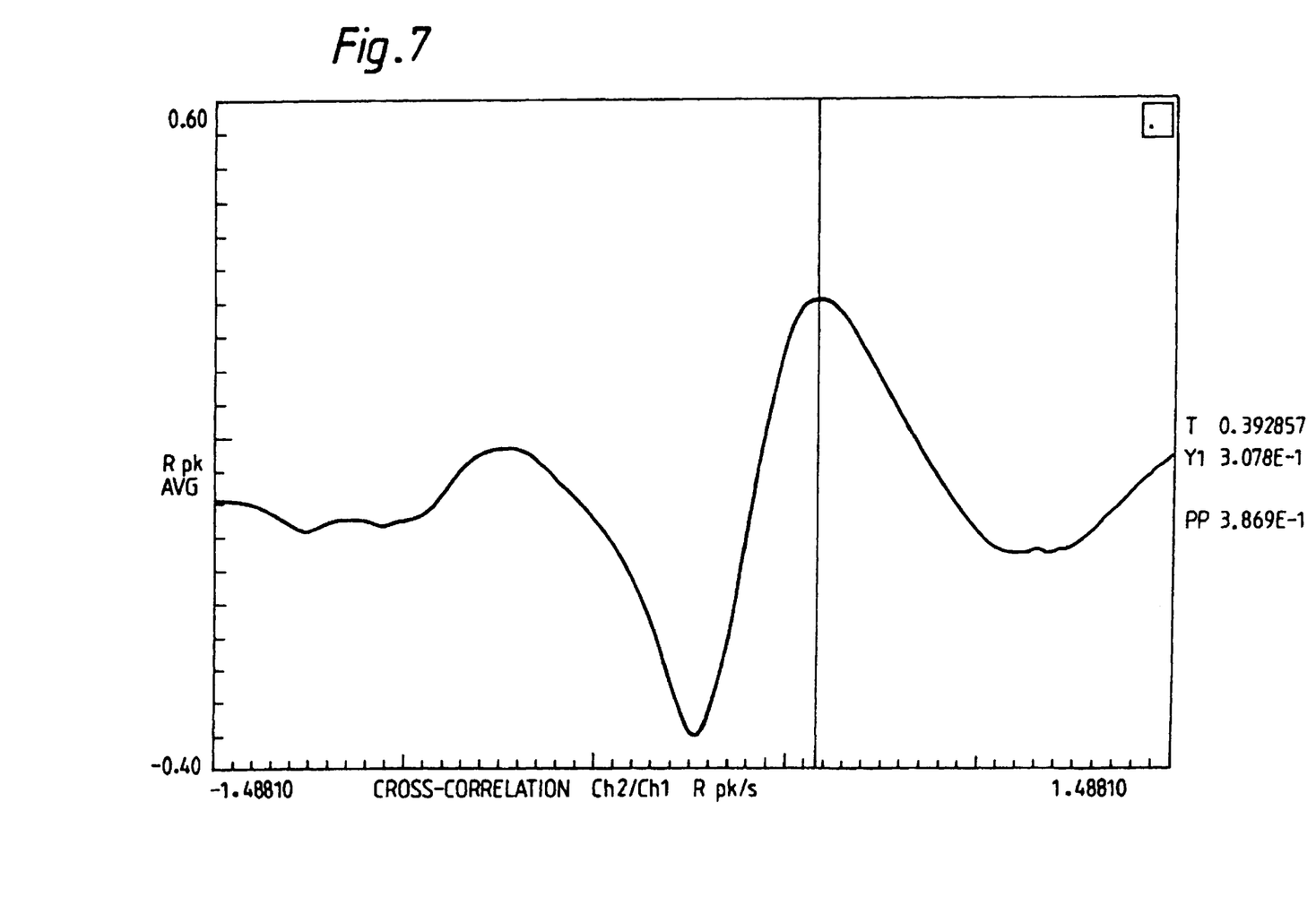
FIG. 7 shows a cross correlation for a tool according to a first aspect of the present invention.

The effect of the present invention can be seen by comparing FIGS. 6 and 7. FIG. 6 shows the cross correlation plot from a tool of the type generally described above where both sensors are run with the same frequency and phase of excitation signal. These results are obtained in a flow loop through which a mixed flow of oil and water is passed, both the oil and water having a flow rate of 5 m$^3$/hr and the loop being inclined at an angle of 30° from vertical. FIG. 7 shows the cross correlation for the same experiment set up but with the sensors operated at 6.73 kHz and 5.6 kHz respectively. As will be seen, the maximum correlation is more easily identified.

An alternative version of a tool incorporating the present invention is shown in FIG. 9. In this case, several sensors 20a, b, c, d . . . are shown, each sensor comprising a pair of electrodes. The signals from any two sensors can be cross-correlated. This allows various operations to be investigated and the optimum chosen for a given set of flow conditions. A degree of redundancy is also provided in such an arrangement. It will be appreciated that signals from more than two sensors can be cross-correlated if required. In any of these cases, the sensors are driven at different, separable frequencies as described above to avoid the cross talk problem.

We claim:

1. A cross correlation fluid flow meter for measuring the rate of flow of a fluid in an upstream to downstream direction, comprising:

a body having a first sensor means and a second sensor means spaced a known distance in the upstream to downstream direction from said first sensor means, said first sensor means having a first transmitter means for transmitting a first electrical signal of a first frequency at a first phase as transmitted, and a first receiver means for receiving said first electrical signal at substantially said first frequency, and said second sensor means having a second transmitter means for transmitting a second electrical signal of a second frequency at a second phase, said second frequency different than said first frequency as transmitted, and a second receiver means for receiving said second electrical signal at substantially said second frequency, said first receiver means not being responsive to said second electrical signal, and said second receiver not being responsive to said first electrical signal, wherein a cross correlation of said first electrical signal as received by said first receiving means and said second electrical signal as received by said second receiving means provides an indication of the rate of the fluid flow the fluid.

2. A cross correlation fluid flow meter according to claim 1, wherein:

said second frequency of said second electrical signal is not harmonically related to said first frequency of said first electrical signal.

3. A cross correlation fluid flow meter according to claim 1, further comprising:

an array of sensors, said first and second sensors being selected from said array.

4. A cross correlation fluid flow meter according to claim 1, wherein:

the fluid flows in an upstream to downstream direction through a chamber, and said body is adapted to fit within the chamber.

5. A cross correlation fluid flow meter according to claim 1, wherein:

said first frequency and said second frequency are substantially in a range of 5–7 kHz.

6. A cross correlation fluid flow meter according to claim 5, wherein:

said first frequency has a frequency difference of approximately 1 kHz from said second frequency.

7. A cross correlation fluid flow meter according to claim 1, wherein:

said first frequency is selected such that it is outside a passband of circuitry in said second sensor.

8. A cross-correlation fluid flow meter according to claim 1, wherein:

said second phase, as transmitted, is out-of-phase with said first phase, as transmitted.

9. A cross correlation fluid flow meter for measuring the rate of flow of a fluid in an upstream to downstream direction, comprising:

a body having a first sensor means and a second sensor means spaced a known distance in the upstream to downstream direction from said first sensor means, said first sensor means having a first transmitter means for transmitting a first electrical signal of a first frequency at a first phase as transmitted, and a first receiver means for receiving said first electrical signal and for providing an indication of a first fluid property of the fluid, and said second sensor means having a second transmitter means for transmitting a second electrical signal of a second frequency at a second phase, said second frequency different from said first frequency, as transmitted, and a second receiver means for receiving said second electrical signal and for providing an indication of a second fluid property of the fluid, said first receiver means not being responsive to said second electrical signal, and said second receiver not being responsive to said first electrical signal, wherein a cross correlation of said indications of said first and second fluid properties provides an indication of the rate of the fluid flow of the fluid.

10. A cross correlation fluid flow meter according to claim 9, wherein:
said first and second fluid properties are respective first and second multiphase variations of the fluid.

11. A cross correlation fluid flow meter according to claim 9, wherein:
said first and second fluid properties are respective first and second electrical impedance measurements of said fluid at said first and second sensor means.

12. A cross correlation fluid flow meter according to claim 9, wherein:
said first and second indications are respective amplitude modulations of said first and second electrical signals as modulated by said respective first and second fluid properties and received by said first and second receiver means.

13. A cross correlation fluid flow meter according to claim 9, wherein:
said second electrical signal is not harmonically related to said first electrical signal.

14. A cross correlation fluid flow meter for measuring the rate of flow of a fluid in an upstream to downstream direction, comprising:
a body having a first sensor means and a second sensor means spaced a known distance in the upstream to downstream direction from said first sensor means,
said first sensor means having a first transmitter means for transmitting a first electrical signal having a first phase and first frequency, as transmitted, and a first receiver means for receiving said first electrical signal and for providing a first indication of a first fluid property, and
said second sensor means having a second transmitter means for transmitting a second electrical signal having a second phase and a second frequency, as transmitted, and a second receiver means for receiving said second electrical signal and for providing a second indication of a second fluid property, wherein said second frequency is different from said first frequency,
said first receiver means not being responsive to said second electrical signal, and said second receiver not being responsive to said first electrical signal,
wherein a cross correlation of said first and second indications provides an indication of the rate of the fluid flow the fluid.

15. A cross correlation fluid flow meter according to claim 14, wherein:
said first frequency and said second frequency are substantially in a range of 5–7 kHz.

16. A cross correlation fluid flow meter according to claim 14, wherein:
said first frequency has a frequency difference of approximately 1 kHz from said second frequency.

17. A cross correlation fluid flow meter according to claim 14, wherein:
said first frequency is selected such that it is outside a passband of circuitry in said second sensor.

18. A method of measuring a rate of fluid flow in an upstream to downstream direction, comprising:
a) providing a first sensor means and a second sensor means spaced a known distance in the upstream to downstream direction from the first sensor means;
b) transmitting, at the first sensor means, a first electrical signal of a first frequency at a first phase as transmitted;
c) receiving, at the first sensor means, the first electrical signal, wherein the first electrical signal, as received, provides a first indication of a first fluid property of the fluid;
d) transmitting, at the second sensor means, a second electrical signal different in frequency than the first electrical signal, as transmitted;
e) receiving, at the second sensor means, the second electrical signal, wherein said second electrical signal, as received, provides a second indication of a second fluid property of the fluid, said first sensor means being non-responsive to said second electrical signal and said second sensor means being non-responsive to said first electrical signal; and
f) cross correlating the first and second indications to determine an indication of the fluid flow rate.

19. A method according to claim 18, wherein:
the first frequency is not harmonically related to the second frequency.

20. A method according to claim 18, wherein:
said first and second frequencies are substantially within the range of 5–7 kHz with a difference of approximately 1 kHz relative to each other.

* * * * *